United States Patent
Li et al.

(10) Patent No.: US 12,449,680 B2
(45) Date of Patent: Oct. 21, 2025

(54) RECONFIGURABLE PHOTONIC INTEGRATED CHIP BASED ON PHASE CHANGE MATERIAL FILM AND PROCESSING METHOD THEREFOR

(71) Applicant: SUN YAT-SEN UNIVERSITY, Guangdong (CN)

(72) Inventors: Zhaohui Li, Guangdong (CN); Hongfei Chen, Guangdong (CN)

(73) Assignee: SUN YAT-SEN UNIVERSITY, Guangdong (CN)

( * ) Notice: Subject to any disclaimer, the term of this patent is extended or adjusted under 35 U.S.C. 154(b) by 0 days.

(21) Appl. No.: 18/270,228

(22) PCT Filed: Apr. 21, 2023

(86) PCT No.: PCT/CN2023/089676
§ 371 (c)(1),
(2) Date: Jun. 29, 2023

(87) PCT Pub. No.: WO2024/001455
PCT Pub. Date: Jan. 4, 2024

(65) Prior Publication Data
US 2024/0168320 A1    May 23, 2024

(30) Foreign Application Priority Data
Jun. 28, 2022  (CN) ............... 202210744180.9

(51) Int. Cl.
*G02F 1/01* (2006.01)

(52) U.S. Cl.
CPC ............... *G02F 1/0126* (2013.01)

(58) Field of Classification Search
CPC ............... G02F 1/0126
See application file for complete search history.

(56) References Cited

U.S. PATENT DOCUMENTS 10,996,398 B1 * 5/2021 Bian ............... G02B 6/2773
2021/0210682 A1 * 7/2021 Cheng ............ H10N 70/066

FOREIGN PATENT DOCUMENTS

CN    113848657 A  * 12/2021

OTHER PUBLICATIONS

CN113848657A translation (Year: 2021).*

* cited by examiner

*Primary Examiner* — Chad H Smith
(74) *Attorney, Agent, or Firm* — JCIPRNET

(57) ABSTRACT

The present invention belongs to the technical field of photonic integrated chips, and more specifically, relates to a reconfigurable photonic integrated chip based on a phase change material film and a processing method therefor. A phase change material film is processed with femtosecond laser and continuous laser to change its surface phase state distribution; and by customizing the number of pulses, power and the like of the laser for processing, and a pattern shape for processing, a specific surface phase state distribution is achieved, so as to achieve the function of a specific photonic integrated chip.

7 Claims, 1 Drawing Sheet

RECONFIGURABLE PHOTONIC INTEGRATED CHIP BASED ON PHASE CHANGE MATERIAL FILM AND PROCESSING METHOD THEREFOR

CROSS-REFERENCE TO RELATED APPLICATION

This application is a 371 application of International PCT application serial no. PCT/CN2023/089676 filed on Apr. 21, 2023, which claims the priority benefit of China application no. 202210744180.9, filed on Jun. 28, 2022. The entirety of each of the above mentioned patent applications is hereby incorporated by reference herein and made a part of this specification.

TECHNICAL FIELD

The present invention belongs to the technical field of photonic integrated chips, and more specifically, relates to a reconfigurable photonic integrated chip based on a phase change material film and a processing method therefor.

DESCRIPTION OF RELATED ART

Photonic integration refers to an optical waveguide type integrated circuit that integrates optical devices with a dielectric waveguide as a center. In other words, a plurality of optical devices are integrated on a substrate to constitute a whole, and the devices are connected to one another by semiconductor optical waveguides, making them have optical paths with certain functions. For example, an external cavity single frequency stabilized laser, a photonic switch array, an optical heterodyne receiver, and an optical transmitter are integrated. Similar to the electronic integration technology, various different optical or photoelectric devices such as lasers, electrooptic modulators, and photodetectors are integrated.

At present, a silicon-based photonic integrated chip is adopted as a mainstream solution for photonic integration. With silicon and silicon-based substrate materials as optical media, corresponding photonic devices and photoelectric devices (including silicon-based optical waveguide devices, light-emitting devices, modulators, detectors, etc.) are manufactured by means of complementary metal oxide semiconductor (CMOS)-compatible integrated circuit processes, and these devices are used to emit, transmit, detect, and process photons, so as to implement their practical applications in the fields of optical communication, optical interconnection, optical computing and the like.

The processing technology of the silicon-based photonic integrated chip has good compatibility with the conventional CMOS technology, facilitating the integration; The silicon material has low cost and is easy to obtain; silicon is transparent in a communication waveband and has low optical loss; and the silicon has a high refractive index of about 3.5 at 1,550 nm, and a bending radius of a silicon nanowire waveguide may be reduced to several microns, making it easy to implement extremely high-density photon integration. The technology for processing the silicon-based photonic integrated chip mainly includes the following steps: 1: spin-coating a silicon wafer with a photoresist for pre-drying; 2: placing the wafer coated with the photoresist into a lithography machine, and exposing the photoresist through mask of a specific pattern; 3: post-drying the photoresist, and performing development; 4: performing electron beam or ion beam etching on a silicon film layer by using the developed photoresist as a mask for silicon etching; and 5: stripping the photoresist, and performing post-processing. However, the technology for processing the silicon-based photonic integrated chip have more complicated steps and higher requirements for processing equipment, and in the processing process, a structure is divided into many layers each with different material and function, where the layers are stacked based on a blueprint layout in sequence one by one from bottom to top. With the complexity of functions, the structure become more complex, and the technical requirements also become higher and higher. Meanwhile, once the structure of the silicon-based photonic integrated chip is processed, it cannot be changed subsequently, which is limited in specific application scenarios.

SUMMARY

To overcome the above defects in the prior art, the present invention provides a reconfigurable photonic integrated chip based on a phase change material film and a processing method therefor. The photonic integrated chip has reconfigurability and is simplified in technological process.

To solve the above technical problem, the present invention adopts the following technical solution: a reconfigurable photonic integrated chip based on a phase change material film includes:
  a dielectric substrate;
  a layer of phase change film arranged on a surface of the dielectric substrate and formed by depositing a phase change material, where under the action of external excitation, the phase change material contained in the phase change film presents different states corresponding to different phase states; and
  a layer of cladding film arranged on a surface of the phase change film, where the cladding film has low absorption of an external excitation signal, that is, an extinction coefficient is less than 0.001.

Further, the external excitation signal is a laser signal capable of triggering a phase state change of the phase change material, and includes a femtosecond laser beam and a continuous laser beam; and the phase change film is formed by depositing the phase change material having low absorption (an extinction coefficient is less than 0.001) in a working waveband and high absorption (an extinction coefficient is greater than 0.5) in a femtosecond laser waveband and a continuous laser waveband, and the phase change material has the properties of continuously adjustable and controllable phase states, non-volatility, and capability of continuously changing between a crystalline state and an amorphous state through excitation modulation under the action of the external excitation signal.

In an embodiment, the working waveband is a laser waveband used in actual operation of the processed photonic integrated chip.

In an embodiment, a method for depositing the phase change material includes, but is not limited to, magnetron sputtering and vacuum evaporation. The dielectric substrate is used as a deposition carrier, and the phase change material may be uniformly deposited on the substrate by means of the magnetron sputtering or thermal evaporation and forms the phase change film.

In an embodiment, the dielectric substrate includes quartz glass, crystalline silicon, amorphous silicon, or silicon nitride; the phase change material includes antimony sulfide, germanium tellurium sulfur, germanium antimony tellurium, germanium arsenic sulfur, or germanium tellurium selenium; and the cladding film includes a silicon oxide film or a zirconia film.

The phase change film not subjected to phase state control still does not have the function of the photonic integrated chip, and its surface phase state needs to be processed to obtain a specific phase state distribution. The present invention further provides a processing method for a reconfigurable photonic integrated chip based on a phase change material film. The surface phase state distribution of the phase change film is changed by the processing method to achieve the device performance of a specific photonic integrated chip. The processing method includes:

obtaining a device structure of the photonic integrated chip described above, where initial states of all phase change films are amorphous states;

performing irradiation on a phase change film by using continuous laser to cause a phase change material contained in the phase change film in a specific area to be processed to be transformed from an amorphous state to a crystalline state, so as to obtain a photonic integrated chip device based on a phase change material film;

performing irradiation on the phase change film by using femtosecond laser to cause the phase change material contained in the phase change film in the specific area undergoing the continuous laser to be transformed from the crystalline state to the amorphous state, so as to erase a surface structure of the photonic integrated chip;

during the processing, measuring a reflection spectrum and a phase change of the specific area being processed by using detection laser, and measuring a phase change rate of the phase change material contained in the phase change film by using the detection laser and a photodetector; and implementing real-time observation on the processing process of the phase change material by using a white light imaging system.

The processing method provided by the present invention has simple process and high processing efficiency. The phase state distribution on the surface of the phase change film is changed by using laser beams. Due to a difference in refractive index in different phase states, the function of a specific integrated chip may be achieved in combination with a specific refractive index distribution, where the specific integrated chip includes, but is not limited to, an on-chip waveguide structure, a Mach-Zehnder optical switch, an on-chip sensor, etc.

Three beams of the femtosecond laser, the continuous laser, and the detection laser, and the white light imaging system are used in the processing method provided by the present invention. The femtosecond laser has a lower pulse width and higher single pulse energy, is mainly used for processing from the crystalline state to the amorphous state; the continuous laser is mainly used for processing from the amorphous state to the crystalline state, and the crystallization degree of the phase change material may be changed in real time by adjusting the energy density of the continuous laser to obtain any intermediate phase state; the detection laser is used to measure the reflection spectrum and the phase change of the processed area; and the phase change rate of the phase change material film may also be measured by combining the detection laser with the high-speed photodetector. The functions of processing, detection, and observation are simultaneously achieved, thereby further improving the efficiency and accuracy of processing.

In an embodiment, during reconfiguration of the surface structure of the photonic integrated chip, firstly, the phase change film is irradiated with the femtosecond laser to cause the phase change material, in the crystalline state, on the surface of the phase change film to be completely transformed to be in the amorphous state, so as to erase an original phase state distribution structure; and then, the phase change film is irradiated with the continuous laser to cause the phase change material contained in the phase change film in the area to be processed to be transformed from the amorphous state to the crystalline state, so as to obtain a new phase state distribution structure.

The phase change material may reversibly change between the crystalline state and the amorphous state under the excitation of an external signal. The phase change material has long-range ordered atomic arrangement and high reflectivity in the crystalline state, and has, in the amorphous state, long-range disordered atomic arrangement and lower reflectivity than that in the crystalline state. When the phase change material has a heating temperature that exceeds a melting point Tm and is suddenly cooled, the amorphous state may be formed, while when the phase change material is slowly cooled, the crystalline state may be formed. In the present invention, the transformation from the crystalline state to the amorphous state is implemented through irradiation of the femtosecond laser with high energy density, so that an irradiated part of the phase change material is melted, and atoms are irregularly arranged through a liquid phase. Due to a short heating time, heat quickly diffuses to the substrate of the film, and the phase change material is suddenly cooled to be at a temperature below a glass transition temperature, making this part stable in the amorphous state with long-range disorder, so that the original phase state distribution structure is erased. Then, the film is slowly heated by the continuous laser with low power density again, so that it may be transformed from the amorphous state to the crystalline state, and the processing process of the continuous laser is controlled to obtain the new phase state distribution structure, thereby achieving the reconfigurability of the surface phase state.

In an embodiment, three beams of the femtosecond laser, the continuous laser, and the detection laser are combined, then vertically enter a high power objective, and gather on a surface of the photonic integrated chip to be processed; and a position for converging the three laser beams is changed by a triaxial movement platform to implement crystallization control of the specific area on the photonic integrated chip.

In an embodiment, during the processing, the phase change film is capable of being detected without moving the photonic integrated chip; when the phase distribution on the surface of the phase change film is detected with the detection laser, the detection laser is split into two beams in front of the objective by a beam splitter; a first beam is transmitted through the beam splitter to vertically enter the objective, converges on the surface of the phase change film, then is reflected on the surface of the phase change film, and is collected by the objective; a second beam is reflected by a reflection mirror and returns the same way to serve as a reference optical path; then, the two beams of the detection laser are recombined on another beam splitter, interference fringes are observed by a camera, and an entire detection optical path system forms a Michelson interferometer to detect phase distribution on a surface of the phase change material; and when a change of the reflection spectrum on the surface of the phase change material is detected, the reference optical path of an interference optical path is blocked with a light shield, only the detection laser beam reflected on the surface of the phase change film is retained, and collection is performed by using a spectrometer or the photodetector, so as to obtain the change of the reflection spectrum on the surface of the phase change material.

In an embodiment, when the observation is performed by using the white light imaging system, a white light LED is used as a lighting source, and then reflective imaging observation is performed on the surface of the phase change film by using a tube lens in cooperation with an objective lens. The processing of the phase change film may be observed in real time by the white light imaging system, thereby reducing the difficulty of operation and process exploration.

On the surface of the phase change film, sizes of converged spots of the femtosecond laser beam and the continuous laser beam are only limited by diffraction limits of the beams. In an experiment, a smaller diffraction limit is obtained by using an objective with a larger numerical aperture, so as to improve the processing accuracy. A spot size of the detection laser on the surface of the phase change film is appropriately increased according to actual requirements, so as to ensure that an area to be detected is exactly covered. The converged spots of the three beams coincide concentrically on the surface of the phase change film.

In an embodiment, the power of the continuous laser is dynamically adjusted and controlled by a high-speed optical switch and an electric laser power attenuator to obtain any intermediate phase state of the phase change film; and an optical field distribution of the femtosecond laser or the continuous laser is dynamically adjusted and controlled by a spatial modulator to implement processing of specific spot requirements for the photonic integrated chip.

In an embodiment, the femtosecond laser has a wavelength of 400-700 nm in a visible waveband, a pulse width of less than 300 fs, and single pulse energy of greater than 31 μJ, and pulse output control is performed through a rising edge of an external trigger signal; the continuous laser has a wavelength of 400-700 nm in the visible waveband, average power of greater than or equal to 110 mW; and the detection laser is continuous laser in the visible waveband and has a wavelength of 520 nm, 700 nm, or 785 nm.

Compared with the prior art, the present invention has the following beneficial effects:

1. According to the reconfigurable photonic integrated chip based on the phase change material film and the processing method therefor provided by the present invention, the phase change material film is processed with the femtosecond laser and the continuous laser to change its surface phase state distribution; and by customizing the number of pulses, power and the like of the laser for processing, and a pattern shape for processing, the specific surface phase state distribution is achieved, so as to achieve the function of the specific photonic integrated chip.

2. Compared with an existing silicon-based photonic integrated chip, the processing method provided by the present invention is simpler, processes of photoresist dispensing, exposure and development, etching, and photoresist removal are not required, and the surface of the phase change material film is processed with the femtosecond laser and the continuous laser to change the phase state distribution. Due to the difference in refractive index in different phase states, the function of the specific integrated chip may be achieved in combination with the specific refractive index distribution.

3. According to the reconfigurable photonic integrated chip based on the phase change material film and the processing method therefor provided by the present invention, the function of the specific photonic integrated chip is achieved by controlling the phase state distribution on the surface of the phase change film; and meanwhile, due to that different phase states of the phase change material are reversible and stable, in a stable external environment, the phase change material is not easily volatilized and oxidized and can continuously maintain a current phase state, and the surface structure of the photonic integrated chip provided by the present invention may be repeatedly rewritten and has reconfigurability.

Reference signs: 1. dielectric substrate; 2. phase change film; 3. cladding film; and 4. crystalline phase change film.

DESCRIPTION OF THE EMBODIMENTS

The technical solutions in the embodiments of the present invention will be clearly and completely described below in conjunction with the accompanying drawings in the embodiments of the present invention. Apparently, the described embodiments are merely a part rather than all of the embodiments of the present invention. The present invention is described in an embodiment below in conjunction with the specific embodiments. The accompanying drawings are only used for exemplary description, represent schematic diagrams only, not physical diagrams, and cannot be construed as a limitation on this patent; to better illustrate the embodiments of the present invention, some components in the accompanying drawings may be omitted, zoomed in or zoomed out, and do not represent the actual size of a product; and it may be understood by those skilled in the art that some well-known structures and their descriptions may be omitted in the accompanying drawings.

In the description of the present invention, it should be understood that the orientational or positional relationships indicated by the terms "upper", "lower", "left", "right", etc. are based on the orientational or positional relationships shown in the accompanying drawings, merely for the convenience of describing the present invention and simplifying the description, rather than indicating or implying that the apparatus or element referred to must have a particular orientation or be constructed and operated in a particular orientation, and therefore cannot be understood as a limitation on this patent. Those of ordinary skill in the art may understand the specific meanings of the above terms according to the specific circumstances. In addition, if the description of "first", "second" and the like is involved in the embodiments of the present invention, the description of "first", "second" and the like is only used for descriptive purposes, and cannot be construed as indicating or implying relative importance or implying the number of technical features indicated. Thus, the features limited with "first" and "second" may explicitly or implicitly include at least one of the features. In addition, "and/or" appearing in the full text means including three parallel solutions, for example, "A and/or B" includes a solution A, a solution B, or a solution A and B.

Embodiment 1

Figure 1:
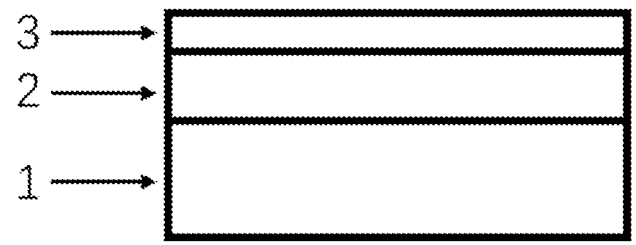
FIG. 1 is a schematic structural diagram of a photonic integrated chip according to the present invention.
Figure 2:
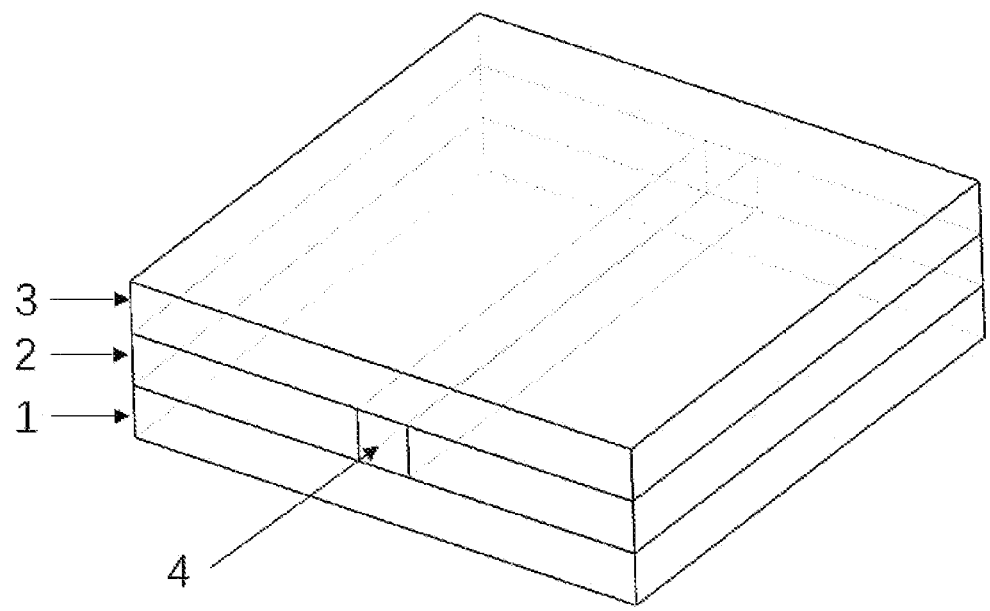
FIG. 2 is a schematic structural diagram of an optical waveguide device processed in Embodiment 3 of the present invention.

As shown in FIG. 1, a reconfigurable photonic integrated chip based on a phase change material film includes: a dielectric substrate 1; a layer of phase change film 2 arranged on a surface of the dielectric substrate 1 and formed by depositing a phase change material, where under the action of external excitation, the phase change material contained in the phase change film 2 presents different states corresponding to different phase states; and a layer of cladding film 3 arranged on a surface of the phase change film 2, where the cladding film 3 has low absorption of an external excitation signal.

Specifically, the external excitation signal is a laser signal capable of triggering a phase state change of the phase change material, and includes a femtosecond laser beam and a continuous laser beam; and the phase change film 2 is formed by depositing the phase change material having low absorption in a working waveband and high absorption in a femtosecond laser waveband and a continuous laser waveband, and the phase change material is continuously adjustable and controllable, non-volatile, and capable of continuously changing between a crystalline state and an amorphous state through excitation modulation under the action of the external excitation signal.

The working waveband is a laser waveband used in actual operation of the processed photonic integrated chip.

In addition, a method for depositing the phase change material includes, but is not limited to, magnetron sputtering and vacuum evaporation. The dielectric substrate 1 is used as a deposition carrier, and the phase change material may be uniformly deposited on the substrate by means of the magnetron sputtering or thermal evaporation and forms the phase change film 2.

The dielectric substrate 1 includes quartz glass, crystalline silicon, amorphous silicon, or silicon nitride; the phase change material includes antimony sulfide, germanium tellurium sulfur, germanium antimony tellurium, germanium arsenic sulfur, or germanium tellurium selenium; and the cladding film 3 includes a silicon oxide film or a zirconia film.

The function of a specific photonic integrated chip is achieved by controlling a phase state distribution on the surface of the phase change film. Meanwhile, due to that different phase states of the phase change material are reversible and stable, a surface structure of the photonic integrated chip may be repeatedly rewritten and has reconfigurability.

Embodiment 2

The phase change film 2 not subjected to phase state control still does not have the function of the photonic integrated chip, and its surface phase state needs to be processed to obtain a specific phase state distribution. This embodiment provides a processing method for a reconfigurable photonic integrated chip based on a phase change material film. The surface phase state distribution of the phase change film 2 is changed by the processing method to achieve the device performance of a specific photonic integrated chip. The processing method includes:

obtaining a device structure of the photonic integrated chip described in Embodiment 1, where initial states of all phase change films 2 are amorphous states;

performing irradiation on a phase change film 2 by using continuous laser to cause a phase change material contained in the phase change film 2 in a specific area to be processed to be transformed from an amorphous state to a crystalline state, so as to obtain a photonic integrated chip device based on a phase change material film;

performing irradiation on the phase change film 2 by using femtosecond laser to cause the phase change material contained in the phase change film 2 in the specific area undergoing the continuous laser to be transformed from the crystalline state to the amorphous state, so as to erase a surface structure of the photonic integrated chip;

during the processing, measuring a reflection spectrum and a phase change of the specific area being processed by using detection laser, and measuring a phase change rate of the phase change material contained in the phase change film 2 by using the detection laser and a photodetector; and implementing real-time observation on the processing process of the phase change material by using a white light imaging system.

The processing method provided by the present invention has simple process and high processing efficiency. The phase state distribution on the surface of the phase change film 2 is changed by using laser beams. Due to a difference in refractive index in different phase states, the function of the specific integrated chip may be achieved in combination with a specific refractive index distribution, where the specific integrated chip includes, but is not limited to, an on-chip waveguide structure, a Mach-Zehnder optical switch, an on-chip sensor, etc.

Three beams of the femtosecond laser, the continuous laser, and the detection laser, and the white light imaging system are used in the processing method provided by the present invention. The femtosecond laser has a lower pulse width and higher single pulse energy, is mainly used for processing from the crystalline state to the amorphous state; the continuous laser is mainly used for processing from the amorphous state to the crystalline state, and the crystallization degree of the phase change material may be changed in real time by adjusting the energy density of the continuous laser to obtain any intermediate phase state; the detection laser is used to measure the reflection spectrum and the phase change of the processed area; and the phase change rate of the phase change material film may also be measured by combining the detection laser with the high-speed photodetector. The functions of processing, detection, and observation are simultaneously achieved, thereby further improving the efficiency and accuracy of processing.

Specifically, during reconfiguration of the surface structure of the photonic integrated chip, firstly, the phase change film 2 is irradiated with the femtosecond laser to cause the phase change film 2, in the crystalline state, on the surface of the phase change film 2 to be completely transformed to be in the amorphous state, so as to erase an original phase state distribution structure; and then, the phase change film 2 is irradiated with the continuous laser to cause the phase change material contained in the phase change film 2 in the area to be processed to be transformed from the amorphous state to the crystalline state, so as to obtain a new phase state distribution structure. The phase change material may reversibly change between the crystalline state and the amorphous state under the excitation of an external signal. The phase change material has long-range ordered atomic arrangement and high reflectivity in the crystalline state, and has, in the amorphous state, long-range disordered atomic arrangement and lower reflectivity than that in the crystalline state. When the phase change material has a heating temperature that exceeds a melting point Tm and is suddenly cooled, the amorphous state may be formed, while when the phase change material is slowly cooled, the crystalline state may be formed. In the present invention, the transformation from the crystalline state to the amorphous state is implemented through irradiation of the femtosecond laser with high energy density, so that an irradiated part of the phase change material is melted, and atoms are irregularly arranged through a liquid phase. Due to a short heating time, heat quickly diffuses to the substrate of the film, and the phase change material is suddenly cooled to be at a temperature below a glass transition temperature, making this part stable in the amorphous state with long-range disorder, so that the original phase state distribution structure is erased. Then, the film is slowly heated by the continuous laser with low power density again, so that it may be transformed from the amorphous state to the crystalline state, and the processing process of the continuous laser is controlled to obtain the new phase state distribution structure, thereby achieving the reconfigurability of the surface phase state.

In an embodiment, a Bragg grating may be prepared on the phase change film 2 to achieve a specific function.

In an embodiment, a chromatic dispersion control device may be prepared on the phase change film 2 and is coupled to other device to implement chromatic dispersion control of the entire chip.

In an optical path system, three beams of the femtosecond laser, the continuous laser, and the detection laser are combined, then vertically enter a high power objective, and gather on a surface of the photonic integrated chip to be processed; and a position for converging the three laser beams is changed by a triaxial movement platform to implement crystallization control of the specific area on the photonic integrated chip. The power of the continuous laser is dynamically adjusted and controlled by a high-speed optical switch and an electric laser power attenuator to obtain any intermediate phase state of the phase change material; and an optical field distribution of the femtosecond laser or the continuous laser is dynamically adjusted and controlled by a spatial modulator to implement processing of specific spot requirements for the photonic integrated chip.

Specifically, during the processing, the phase change film 2 is capable of being detected without moving the photonic integrated chip; when the phase distribution on the surface of the phase change film 2 is detected with the detection laser, the detection laser is split into two beams in front of the objective by a beam splitter; a first beam is transmitted through the beam splitter to vertically enter the objective, converges on the surface of the phase change film 2, then is reflected on the surface of the phase change film 2, and is collected by the objective; a second beam is reflected by a reflection mirror and returns the same way to serve as a reference optical path; then, the two beams of the detection laser are recombined on another beam splitter, interference fringes are observed by a camera, and an entire detection optical path system forms a Michelson interferometer to detect phase distribution on a surface of the phase change material; and when a change of the reflection spectrum on the surface of the phase change material is detected, the reference optical path of an interference optical path is blocked with a light shield, only the detection laser beam reflected on the surface of the phase change film 2 is retained, and collection is performed by using a spectrometer or the photodetector, so as to obtain the change of the reflection spectrum on the surface of the phase change material.

In addition, when the observation is performed by using the white light imaging system, a white light LED is used as a lighting source, and then reflective imaging observation is performed on the surface of the phase change film 2 by using a tube lens in cooperation with an objective lens. The processing of the phase change film 2 may be observed in real time by the white light imaging system, thereby reducing the difficulty of operation and process exploration.

On the surface of the phase change film 2, sizes of converged spots of the femtosecond laser beam and the continuous laser beam are only limited by diffraction limits of the beams. In an experiment, a smaller diffraction limit is obtained by using an objective with a larger numerical aperture, so as to improve the processing accuracy. A spot size of the detection laser on the surface of the phase change film 2 is appropriately increased according to actual requirements, so as to ensure that an area to be detected is exactly covered. The converged spots of the three beams coincide concentrically on the surface of the phase change film 2.

The femtosecond laser has a wavelength of 400-700 nm in a visible waveband, a pulse width of less than 300 fs, and single pulse energy of greater than 3 μJ, and pulse output control is performed through a rising edge of an external trigger signal; the continuous laser has a wavelength of 400-700 nm in the visible waveband, average power of greater than or equal to 110 mW; and the detection laser is continuous laser in the visible waveband and has a wavelength of 520 nm, 700 nm, or 785 nm.

Embodiment 3

In this embodiment, an optical waveguide structure is prepared by using the photonic integrated chip provided in Embodiment 1 and the processing method provided in Embodiment 2. For example, a process for manufacturing a photonic integrated chip device with a surface structure specifically includes steps below.

Firstly, a uniform device structure, that is, a structure of the photonic integrated chip provided in Embodiment 1 is obtained, where a layer thickness of a phase change film 2 is about 800 nm, and initial states of all phase change materials are amorphous states.

Then, a phase change material on a surface of the phase change film is processed with continuous laser to completely crystallize the phase change material, where in this experiment, the continuous laser has a wavelength of 520 nm and power of about 50 mW. A crystallization area is controlled to be a straight line with a width of about 800 nm and a length of 20 mm.

Next, two sides of the crystallization area are processed with a femtosecond laser beam to cause the phase change material at corresponding positions to be decrystallized, where due to characteristics of an ultrashort pulse of the femtosecond laser, its thermal diffusion effect may be ignored, and the femtosecond laser beam may effectively improve the smoothness of a side surface of a waveguide, so as to reduce the loss.

A refractive index of the phase change material in the crystallization area is greater than that in an amorphization area, and a refractive index difference is about 0.9. As a result, an optical waveguide device based on a phase change material film is obtained.

Apparently, the above embodiments of the present invention are only examples to clearly illustrate the present invention, rather than defining the embodiments of the present invention. Those of ordinary skill in the art may also make other changes or variations in different forms on the basis of the above description. It is unnecessary and impossible to enumerate all embodiments herein. Any modifications, equivalent substitutions, improvements, etc. made within the spirit and principle of the present invention should be included in the scope of protection of the claims of the present invention.

What is claimed is:

1. A processing method for a reconfigurable photonic integrated chip based on a phase change material film, comprising:
    obtaining a device structure of a photonic integrated chip, the photonic integrated chip comprising:
        a dielectric substrate (1);
        a layer of phase change film (2) arranged on a surface of the dielectric substrate (1) and formed by depositing a phase change material, wherein under an action of external excitation, the phase change material contained in the phase change film (2) presents different states corresponding to different phase states; and
        a layer of cladding film (3) arranged on a surface of the phase change film (2), wherein the cladding film (3) has low absorption of an external excitation signal, and the low absorption refers to having an extinction coefficient less than 0.001,
        wherein initial state of the phase change film (2) is amorphous state;
    performing irradiation on the phase change film (2) by using a continuous laser to cause the phase change material contained in the phase change film (2) in a specific area to be processed to be transformed from an amorphous state to a crystalline state, so as to obtain a photonic integrated chip device based on the phase change material film;
    performing irradiation on the phase change film (2) by using a femtosecond laser to cause the phase change material contained in the phase change film (2) in the specific area undergoing the continuous laser to be transformed from the crystalline state to the amorphous state, so as to erase a surface structure of the photonic integrated chip;
    during the processing method, measuring a reflection spectrum and a phase change of the specific area being processed by using a detection laser, and measuring a phase change rate of the phase change material contained in the phase change film (2) by using the detection laser and a photodetector; and
    implementing real-time observation on the processing method of the phase change material by using a white light imaging system.

2. The processing method for the reconfigurable photonic integrated chip based on the phase change material film according to claim 1, wherein during reconfiguration of the surface structure of the photonic integrated chip, firstly, the phase change film (2) is irradiated with the femtosecond laser to cause the phase change material, in the crystalline state, on a surface of the phase change film (2) to be completely transformed to be in the amorphous state, so as to erase an original phase state distribution structure; and then, the phase change film (2) is irradiated with the continuous laser to cause the phase change material contained in the phase change film (2) in the specific area to be processed to be transformed from the amorphous state to the crystalline state, so as to obtain a new phase state distribution structure.

3. The processing method for the reconfigurable photonic integrated chip based on the phase change material film according to claim 1, wherein three beams of the femtosecond laser, the continuous laser, and the detection laser are combined, then vertically enter a high power objective, and gather on a surface of the photonic integrated chip to be processed; and a position for converging the three laser beams is changed by a triaxial movement platform to implement crystallization control of the specific area on the photonic integrated chip.

4. The processing method for the reconfigurable photonic integrated chip based on the phase change material film according to claim 3, wherein during the processing method, the phase change film (2) is capable of being detected without moving the photonic integrated chip; when a phase distribution on a surface of the phase change film (2) is detected with the detection laser, the detection laser is split into two beams in front of the objective by a beam splitter; a first beam is transmitted through the beam splitter to vertically enter the objective, converges on the surface of the phase change film (2), then is reflected on the surface of the phase change film (2), and is collected by the objective; a second beam is reflected by a reflection mirror and returns the same way to serve as a reference optical path; then, the two beams of the detection laser are recombined on another beam splitter, interference fringes are observed by a camera, and an entire detection optical path system forms a Michelson interferometer to detect a phase distribution on a surface of the phase change material; and when a change of the reflection spectrum on the surface of the phase change material is detected, the reference optical path of an interference optical path is blocked with a light shield, only the detection laser beam reflected on the surface of the phase change film (2) is retained, and collection is performed by using a spectrometer or the photodetector, so as to obtain the change of the reflection spectrum on the surface of the phase change material.

5. The processing method for the reconfigurable photonic integrated chip based on the phase change material film according to claim 4, wherein when the observation is performed by using the white light imaging system, a white light LED is used as a lighting source, and then reflective imaging observation is performed on the surface of the phase change film (2) by using a tube lens in cooperation with an objective lens.

6. The processing method for the reconfigurable photonic integrated chip based on the phase change material film according to claim 3, wherein power of the continuous laser is dynamically adjusted and controlled by a high-speed optical switch and an electric laser power attenuator to obtain any intermediate phase state of the phase change film (2).

7. The processing method for the reconfigurable photonic integrated chip based on the phase change material film according to claim 6, wherein the femtosecond laser has a wavelength of 400-700 nm in a visible waveband, a pulse width of less than 300 fs, and single pulse energy of greater than 3 µJ; the continuous laser has a wavelength of 400-700 nm in the visible waveband, average power of greater than or equal to 110 mW; and the detection laser is continuous laser in the visible waveband and has a wavelength of 520 nm, 700 nm, or 785 nm.

* * * * *